Figure 1:
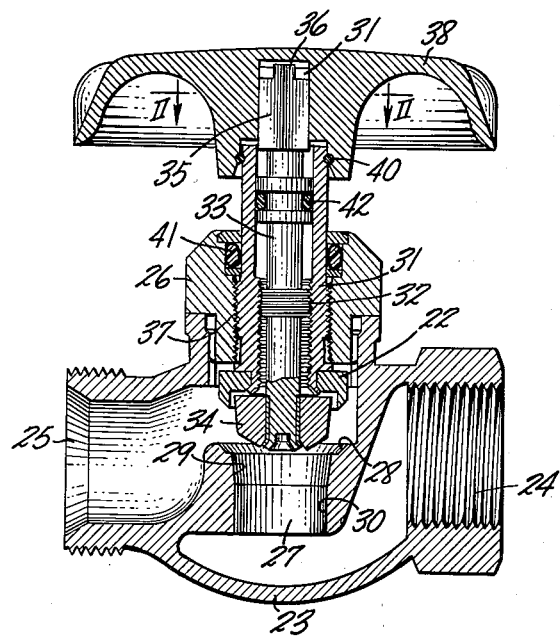

April 11, 1961

F. USSELMANN ET AL 2,979,083

VALVE ARRANGEMENT

Filed Jan. 3, 1958

United States Patent Office 2,979,083
Patented Apr. 11, 1961

2,979,083

VALVE ARRANGEMENT

Fernand Usselmann, Sceaux, and Alfred Verhelle, La Garenne Colombes, France, assignors to société anonyme dite: Compagnie des Freins et Signaux Westinghouse, Paris, France Filed Jan. 3, 1958, Ser. No. 706,938

Claims priority, application France Jan. 10, 1957

2 Claims. (Cl. 137—637.2)

This invention relates to valves for the control of fluid flow, and more especially to dual valve arrangements of the type including two separately displaceable valve members a first or primary one of which is operable to preset the total range of flow variations, and the other or secondary valve member operable to adjust the flow rate to a desired value. Dual valve arrangements of this type are frequently used in connection with space-heating radiator systems utilizing hot water or steam, and the primary presetting valve member is adapted to be adjusted by the fitters on initial installation of the system but not by the user, while the secondary, adjusting valve member is employed by the user in order to adjust the flow of heating fluid at will within the preset range. It will be understood however that the novel valve system is not restricted to heating systems but is broadly applicable in connection with flow regulation of various fluid media regardless of the particular use to which the fluid is put.

Conventional valve arrangements of this broad type have employed rotatable plug-type valve members or axially displaceable needle-type valve members or combinations of both. A rotatable valve member when used as the primary member is relatively crude and inaccurate and does not permit a precise presetting adjustment, and when used as the secondary member it does not usually provide a perfectly tight seal in the closed condition of the valve. Moreover such rotatable plug members have a major drawback in that their construction and operation involve large contacting surface areas thus tending, after a relatively short service period, to cause jamming and difficult operation.

Axially displaceable valve members are generally free of the above drawbacks and provide for a highly accurate presetting adjustment and low friction due to relatively small contacting areas. However conventional valve systems using axial displacement have had another serious drawback in that the presetting adjustment generally acts to limit the total amount of axial displacement available to the user in adjusting the rate of flow, so that the resulting system in effect acts simply as an ordinary single cock in which the stroke can be limited to a maximum value, which as in a borderline case can be equal to zero. Or in other constructions, only the useful or effective portion of the total displacement impartable by the user to the secondary valve member was limited by the presetting operation, and in such cases the user has to exert superfluous effort in operating the secondary member over a greater distance than necessary. In either case moreover, at low rates of flow the adjustment lacks smoothness and progressivity, is more in the nature of a hit-and-miss adjustment, and the user does not obtain an accurate "feel" of the response of the valve.

It is an object of this invention to provide an improved dual-setting valve arrangement of the type described. Another object is to provide such a valve arrangement which will possess the advantageous aspects of axially-displaceable valve members including tight sealing, accurate adjustment and low friction, while being free of the drawbacks thereof such as mentioned above. More specifically, an object is to provide an axially displaceable dual-setting valve system wherein the secondary valve member serving to adjust the flow by the user will have a constant displacement stroke acting to vary the rate of flow gradually throughout the whole extent of the displacement, regardless of the presetting position previously established for the primary members, e.g. by the fitter of the valve. A further object is to provide an improved valve system of the above character which will be simple and inexpensive to construct and maintain, and easy to install, operate and dismantle when required, and one wherein the presetting adjustment cannot be tampered with by an unauthorized person.

According to an aspect of the invention, an improved dual setting valve arrangement is characterized in the minimum presetting position of the primary member both the primary member and the secondary member are simultaneously positioned in their respective sealing positions.

According to another aspect of the invention, the secondary valve member is arranged to have a constant displacement stroke regardless of the preset position of the primary valve member and both valve members are bodily displaceable to exert a smooth and gradual action on the rate of fluid flow throughout the full extent of bodily displacement of said members, regardless of the preset relative position of said members.

Figure 2:
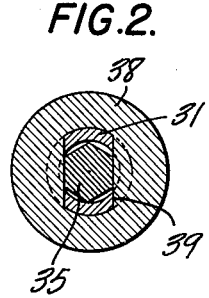

The above and further objects, features and advantages of the invention will appear as the disclosure proceeds. In the accompanying drawings:

Fig. 1 is an axial cross section of an improved dual-setting valve assembly; and Fig. 2 is a section on line II—II of Fig. 1.

As shown, the novel dual-adjustment valve comprises a valve housing or body 23 formed with aligned inlet and outlet apertures 24, 25 therein. An axially apertured cover member or bonnet 26 is threadedly connectable with the top of the housing 23. An inner partition wall separates the inlet 24 from the outlet 25 within the housing and is formed with an aperture 27 in axial alignment with the aperture in cover member 26. The aperture 27 has an uppermost frustoconical entrance portion 28 of short axial extent providing a sealing valve seat as will later appear, an intermediate frustoconical portion 29 of smaller cone angle but greater axial extent than portion 28, and a lowermost cylindrical portion 30.

With the aperture 27 cooperate a pair of coaxial sealing members 22 and 34, the member 34 being the primary or presetting member and member 22 being the secondary or adjusting member. Secondary member 22 is carried at the lower end of a tubular shaft 31. Shaft 31 extends vertically through the axial aperture in cover member 26 and includes an outer threaded portion 37 engaging an inner thread in the cover member 26.

The secondary valve member 22 has an annular frustoconical lower peripheral surface adapted to engage with the section 28 of the aperture 27. The tubular shaft 31 has sealing engagement with the top of the aperture in member 26 by means of an annular seal 41 spaced above the threaded part 37.

Extending through the tubular recess in shaft 31 is a spindle 33 which has threaded engagement at 32 with the shaft 31, and said spindle carries at its lower end the primary sealing member 34. Member 34 extends axially beyond, and radially somewhat inwardly with respect to the secondary sealing member 22 and has a slightly tapered outer peripheral surface adapted to cooperate with both sections 29 and 30 in the aperture 27 to provide accurate flow adjustment while presenting low resistance to fluid flow in the raised position of said member.

Spindle 33 in its upper or outer end portion is formed with a hexagonal section 35 and terminates in an upwardly protecting drive portion or tip 36 adapted to be engaged with a special tool or key for rotating the spindle 33 and thereby vertically adjusting the position of primary member 34 relatively to the aperture 27.

Over the upper end of the tubular shaft 31 carrying the secondary valve member 22 an adjusting wheel 38 is fittable being securable thereto by means of a snap-ring 40 projecting into annular grooves in the shaft 31 and in hub of the wheel 38. It will be noted that the snap ring provides a simple and effective way of connecting the handwheel to the operating shaft 31 facilitating assembly and dismantling without requiring the use of tool. At the same time the connection only requires the formation of a shallow peripheral groove in the shaft 31 so that the shaft is substantially not weakened.

The recess in wheel 38 is formed with opposite flatted portions 39 (see Fig. 2) adapted to engage opposite sides of the hexagon portion 35 in the spindle 33. Thus after initial adjustment or presetting of the spindle 33, fitting the wheel 38 in place will block the spindle 33 in its preset position owing to the engagement between flats 39 and the hexagon section of the spindle, in any selected one of six angular settings.

An annular seal 41 is interposed between tubular shaft 31 and cover member 26; and an annular seal 42 is interposed between shaft 31 and spindle 33.

To effect the initial presetting adjustment, the operator will first remove the wheel 38 thereby releasing the hexagon portion 35 of spindle 33, and then insert a specially provided key into engagement with projection 36, whereby to rotate the spindle 33 relatively to tubular shaft 31 and thus adjust the vertical position of the primary sealing member 34 with respect to the tapered intermediate section 29 of orifice 27, and with respect to its entry into the cylindrical lower section 30 of said orifice. It is noted that due to the requirement for the special tool to rotate the spindle 33, the arrangement is tamperproof.

The handwheel 38 is then fitted in position with the snap ring, whereupon the spindle 33 is blocked in its selected setting with respect to shaft 31. Thereafter, rotation of the wheel 38 by the user will act to rotate both spindle 31 and shaft 33 bodily together, to impart bodily axial up-and-down displacements to both primary sealing member 34 and secondary sealing member 22. The relative dimensioning of the part is such that in the lowermost position of the assembly including both sealing members and with the primary sealing member 34 adjusted to its lowermost position relative to the secondary sealing member 22, both of the sealing surfaces of both members are disposed simultaneously engaging respective surface portions 28, 29 of the valve orifice 27. When handwheel 38 is turned by the user to adjust the rate of fluid flow through the system to a desired value, the rate of flow is gradually and smoothly varied even at very low flow rates, due to the contours of the respective cooperating tapered surfaces of orifice 27 and sealing members 34 and 22.

It will be understood that various modifications may be made in the constructional details illustrated and described within the scope of the present invention. Thus while a straight valve construction was shown the invention would also be applicable to an angled valve structure.

What is claimed is:

1. In a valve assembly having a valve body provided with inlet and outlet apertures therein, a valve bonnet on said body, a primary valve member internally of said body and a secondary valve member having a greater diameter then the primary valve member and being operable to a seated position closing the valve and unseated positions opening the valve, means in the valve body defining an elongated passageway between the valve inlet and outlet providing separate seats for said primary and secondary valve members disposed axially on inner sidewalls of said passageway and circumferentially of said passageway, the improvement which comprises a rotatable hollow shaft extending through said bonnet in a sealed condition into said body and connected at an inner end thereof to said secondary valve member, said bonnet having an internally threaded bore through which said shaft extends and the shaft having external threads cooperative with said bonnet threads for moving the shaft axially in opposite directions when rotated in opposite directions, an externally threaded spindle extending axially through said shaft connected at an inner end thereof to said primary valve member so that primary valve member is disposed axially of the secondary valve member, said shaft having internal threads cooperative with the spindle external threads for allowing presetting of the relative axial positions of the shaft and spindle thereby to preset the relative axial positions of the valve members, said spindle having an outer hexagonal end portion adapted for engagement by a tool to rotate the spindle separately from the shaft, and a manually operable wheel removably connectable with the outer end of said shaft having a recess for receiving the outer end of the spindle and flattened side walls cooperative with said hexagonal end portion to hold the spindle in its preset relative position with respect to the hollow shaft and in an inaccessible condition so long as said wheel is on the shaft, the wheel being manually operable at will for bodily rotating the shaft thereby to bodily rotate the spindle in conjunction with the shaft and jointly displace them axially to displace and position the primary and secondary valve members.

2. In a valve assembly according to claim 1, in which said end portion has a projecting tip part thereof so adapted as to be engageable by a tool for rotation of the spindle.

References Cited in the file of this patent

UNITED STATES PATENTS

| 1,166,884 | Bergo | Jan. 4, 1916 |

FOREIGN PATENTS

| 30,087 | Great Britain | Nov. 20, 1897 |
| 144,679 | Germany | Sept. 23, 1903 |
| 592,598 | France | May 2, 1925 |
| 17,855 | Germany | June 21, 1956 |
| 1,012,134 | Germany | July 11, 1957 |